United States Patent
Daugela et al.

(10) Patent No.: US 10,520,740 B2
(45) Date of Patent: Dec. 31, 2019

(54) DIAMOND SHAPED LENS SYSTEM

(71) Applicant: SPECTRUM OPTIX INC., Calgary, Alberta (CA)

(72) Inventors: John Daugela, Calgary (CA); Darcy Daugela, Calgary (CA)

(73) Assignee: SPECTRUM OPTIX INC., Calgary, Alberta (CA)

( * ) Notice: Subject to any disclaimer, the term of this patent is extended or adjusted under 35 U.S.C. 154(b) by 0 days.

(21) Appl. No.: 15/913,614

(22) Filed: Mar. 6, 2018

(65) Prior Publication Data

US 2018/0252896 A1 Sep. 6, 2018

Related U.S. Application Data

(60) Provisional application No. 62/467,437, filed on Mar. 6, 2017.

(51) Int. Cl.
| | |
|---|---|
| *G02B 27/09* | (2006.01) |
| *G02B 5/04* | (2006.01) |
| *G02B 27/12* | (2006.01) |
| *G02B 27/00* | (2006.01) |

(Continued)

(52) U.S. Cl.
CPC .......... *G02B 27/0955* (2013.01); *G02B 5/04* (2013.01); *G02B 13/0015* (2013.01); *G02B 13/10* (2013.01); *G02B 27/0911* (2013.01); *G02B 27/0972* (2013.01); *G02B 27/0977* (2013.01); *G02B 27/126* (2013.01); *G02B 27/0056* (2013.01)

(58) Field of Classification Search
CPC ........ G02B 5/04; G02B 5/045; G02B 27/106; G02B 27/126; G02B 27/12–27/149; G02B 27/0911

USPC .................... 359/638, 640; 385/36
See application file for complete search history.

(56) References Cited

U.S. PATENT DOCUMENTS

| | | | | | |
|---|---|---|---|---|---|
| 4,411,492 | A | * | 10/1983 | Bluege ............. | G02B 27/1006 359/572 |
| 5,594,563 | A | * | 1/1997 | Larson .............. | G02B 5/26 348/E9.027 |

(Continued)

OTHER PUBLICATIONS

International Search Report and Written Opinion dated Jun. 29, 2018 for corresponding PCT Application No. PCT/IB2018/000293 (8 pages).

*Primary Examiner* — Zachary W Wilkes
(74) *Attorney, Agent, or Firm* — Lewis Roca Rothgerber Christie LLP

(57) ABSTRACT

A diamond-shaped lens system includes: a half diamond-shaped lens including refractive material and having a first surface, a second surface and a third surface for refracting incident light beams from an object having a width of X, from the first surface towards the second surface; a first reflective material positioned at the second surface of the half diamond-shaped lens for reflecting the refracted light beams at a first angle toward the third surface; a second reflective material positioned at the third surface of the half diamond-shaped lens for reflecting the light beams reflected from the first reflective material toward the first surface to exit the first surface at a second angle toward the third surface to form an image of the object with a width Y; and; an apparatus for processing the image of the object to reduce chromatic aberrations.

14 Claims, 5 Drawing Sheets

(51) Int. Cl.
*G02B 13/00* (2006.01)
*G02B 13/10* (2006.01)

(56) References Cited

U.S. PATENT DOCUMENTS

| | | | |
|---|---|---|---|
| 6,363,220 B1 * | 3/2002 | Ide | G02B 7/08 |
| | | | 348/345 |
| 6,485,149 B1 * | 11/2002 | Berg | G02B 5/265 |
| | | | 359/558 |
| 6,704,128 B2 * | 3/2004 | Takeyama | G02B 5/04 |
| | | | 359/630 |
| 2017/0038571 A1 | 2/2017 | Daugela | |

* cited by examiner

DIAMOND SHAPED LENS SYSTEM

CROSS-REFERENCE TO RELATED APPLICATIONS

This Patent Application claims the benefits of U.S. Provisional Patent Application Ser. No. 62/467,437, filed on Mar. 6, 2017 and entitled "Diamond Shape Lens and Optical System," the entire content of which is hereby expressly incorporated by reference.

FIELD OF THE INVENTION

The disclosed invention generally relates to a diamond shaped lens system and correcting aberrations of images from the system using hardware configuration and/or image processing techniques.

BACKGROUND

The disclosed invention generally relates to a diamond shape lens system and correcting aberrations of images from the lens system. This Patent Application is related to co-pending U.S. patent application Ser. No. 15/222,058, filed on Jul. 28, 2016 and entitled "Flat Wedge Shaped Lens and Image Processing Method" (now issued as U.S. Pat. No. 9,759,900), the entire content of which is hereby expressly incorporated by reference.

Anamorphic prism systems are known to compress or expand light beams, but they have not been used for image capture for a variety of reasons. These prism systems are afocal, and do not focus an image onto an image plane, making them unsuitable as an imaging system. Typically, anamorphic prism systems are designed for collimated light from one incident angle and therefore their performance degrades with off axis light, resulting in a lens with a very limited field of view. Many anamorphic prisms have chromatic dispersion resulting in chromatic aberrations making them unsuitable for multi-color images. Accordingly, anamorphic prism systems are almost exclusively used to shape laser beams, often monochromatic, and are generally referred to as beam expanders and beam compressors.

Achromatic anamorphic prism systems, generally require multiple prisms making them large and heavy. In addition, since the achromatic anamorphic prism systems only compress or expand in one dimension, it would require multiple of these systems to compress equally in two dimensions to maintain the image aspect ratio, which makes the systems even larger and heavier. For these reasons anamorphic prism systems have not been used for image capture.

Imaging devices such as cameras, microscopes and telescopes can be heavy and large. A large portion of this weight is due to the design of the optical lens elements, which can include heavy curved lenses, and the structure to support these lens separated by long focal distances. These imaging devices can be large (thick) mainly because in a typical lens system, the opening aperture to system device depth ratio is small. Moreover, to optically improve image resolution with the traditional lens systems, more device depth (longer focal length) is required in order to reduce lens refraction and minimize lens aberrations. The device depth of the imaging device can limit the imaging systems' performance and design. For example, the size and weight constraints of mobile, compact, or weight constrained imaging devices can limit resolution because they constrain the maximum focal length. The disclosed invention can increase the effective focal length in these systems, and improve resolution with the same size and weight constraints.

Additionally, conventional curved lenses have many different types of aberrations that reduce image resolution (spherical, coma, chromatic, and others). To correct these aberrations, conventional curved lenses use extra-large pieces of precision glass, adding weight, size and cost to the lens system.

Typically, conventional lens systems capture one image from one continuous field of view through a circular aperture. Using this conventional lens system to capture multiple simultaneous images typically lowers each image quality, requires duplicated lens systems, or requires increasing the system aperture size to maintain quality. These options typically result in lower quality images, or systems that are substantially larger and more costly.

SUMMARY OF THE INVENTION

In some embodiments, the disclosed invention is a diamond shape lens system that obtain a high quality image with a more compact optical or other energy waveform lens system. The disclosed invention reduces the size, weight and cost of conventional curved lenses, and in some devices eliminates their use entirely. Moreover, the disclosed invention can efficiently capture multiple simultaneous images with the same (or different) field of view and wavelengths.

In some embodiments, the disclosed invention is a diamond shape lens system including: a half diamond-shaped lens comprising of refractive material and having a first surface, a second surface and a third surface for refracting incident light beams from an object having a width of X, from the first surface towards the second surface; a first reflective material positioned at the second surface of the half diamond-shaped lens for reflecting the refracted light beams at a first angle toward the third surface; a second reflective material positioned at the third surface of the half diamond-shaped lens for reflecting the light beams reflected from the first reflective material toward the first surface to exit the first surface at a second angle toward the third surface to form an image of the object with a width Y; and an apparatus for processing the image of the object to reduce chromatic aberrations.

In some embodiments, the disclosed invention is a diamond shape lens system including: a first half diamond-shaped lens comprising of refractive material and having a first surface, a second surface and a third surface for refracting incident light beams from a first object having a width of X1, from the first surface towards the second surface; a second half diamond-shaped lens positioned next to the first half diamond-shaped lens and comprising of refractive material and having a first surface, a second surface and a third surface for refracting incident light beams from a second object having a width of X2, from the first surface towards the second surface. The third surface of the first half diamond-shaped lens is positioned next to the third surface of the second half diamond-shaped lens to form a full diamond-shaped lens, the full diamond-shaped lens having a first surface the same as the first surface of the first half diamond-shaped lens, a second surface the same as the second surface of the first half diamond-shaped lens, a third surface the same as the second surface of the second half diamond-shaped lens, and a fourth surface the same as the first surface of the second half diamond-shaped lens. The diamond shape lens system further includes a first reflective material positioned at the second surface of the full diamond-shaped lens for reflecting refracted light beams from the first surface of the full diamond-shaped lens at a first angle toward the fourth surface of the full diamond-shaped lens to exit the fourth surface to form a first image of the first object with a width Y1; a second reflective material positioned at the third surface of the half diamond-shaped lens for reflecting light beams reflected from the fourth surface of the full diamond-shaped lens at a second angle toward the first surface of the full diamond-shaped lens to exit the first surface to form a second image of the second object with a width Y2; and a chromatic control structure for correcting chromatic dispersions of the first and second image.

The chromatic control structure may positioned on one or more of the second surface and the third surface of the full diamond-shaped lens; or between the third surface of the first half diamond-shaped lens and the third surface of the second half diamond-shaped lens to form a shared chromatic control structure shared by the first and second half diamond-shaped lenses.

When X is smaller than Y the lens system expands the image of the object, and when X is larger than Y, the lens system compresses the image of the object. Microscopes, binoculars, telescopes, telecentric lens systems and rifle scopes can utilize the disclosed invention for more accurate result, smaller sizes and lower costs.

BRIEF DESCRIPTION OF THE DRAWINGS

A more complete appreciation of the disclosed invention, and many of the attendant features and aspects thereof, will become more readily apparent as the disclosed invention becomes better understood by reference to the following detailed description when considered in conjunction with the accompanying drawings in which like reference symbols indicate like components.

DETAILED DESCRIPTION

Embodiments of the disclosed invention are directed to diamond shape lens systems that obtain a high quality image with a more compact optical or other energy waveform lens system. In some embodiments, the disclosed invention corrects aberrations of images from the diamond lens system using structures such as, prisms and/or image processing techniques. Increasing the initial surface area of the lens objective (aperture) allows more light or electromagnetic (EM) wave energy to be collected, and can result in a faster and better image quality. However, increasing the aperture to improve image quality and speed typically results in a proportionally larger size lens system and device depth.

The diamond shape lens system according to the disclosed invention has an increased initial surface area of the lens objective (aperture), with a decreased corresponding device depth in the lens stack. The diamond shape lens system collects the EM waves, such as visible and nonvisible lights, with a much larger aperture-to-device depth ratio. This means higher quality images can be captured faster with a smaller device depth. A diamond shape lens system may be very large for telescopes for example, and small for microscopes and mobile devices, and yet maintain a large aperture-to-device depth ratio.

Some embodiments of the disclosed invention are directed to an optical system including one or more diamond shape lens(s) to concentrate light in a compact form factor. One or more diamond shape lens can be used in the optical system to concentrate light in solar and energy concentration applications, and in imaging devices such as cameras, microscope and telescopes to enable a more compact design. This optical system improves image quality by allowing a larger aperture to fit within a constrained space.

Figure 1:
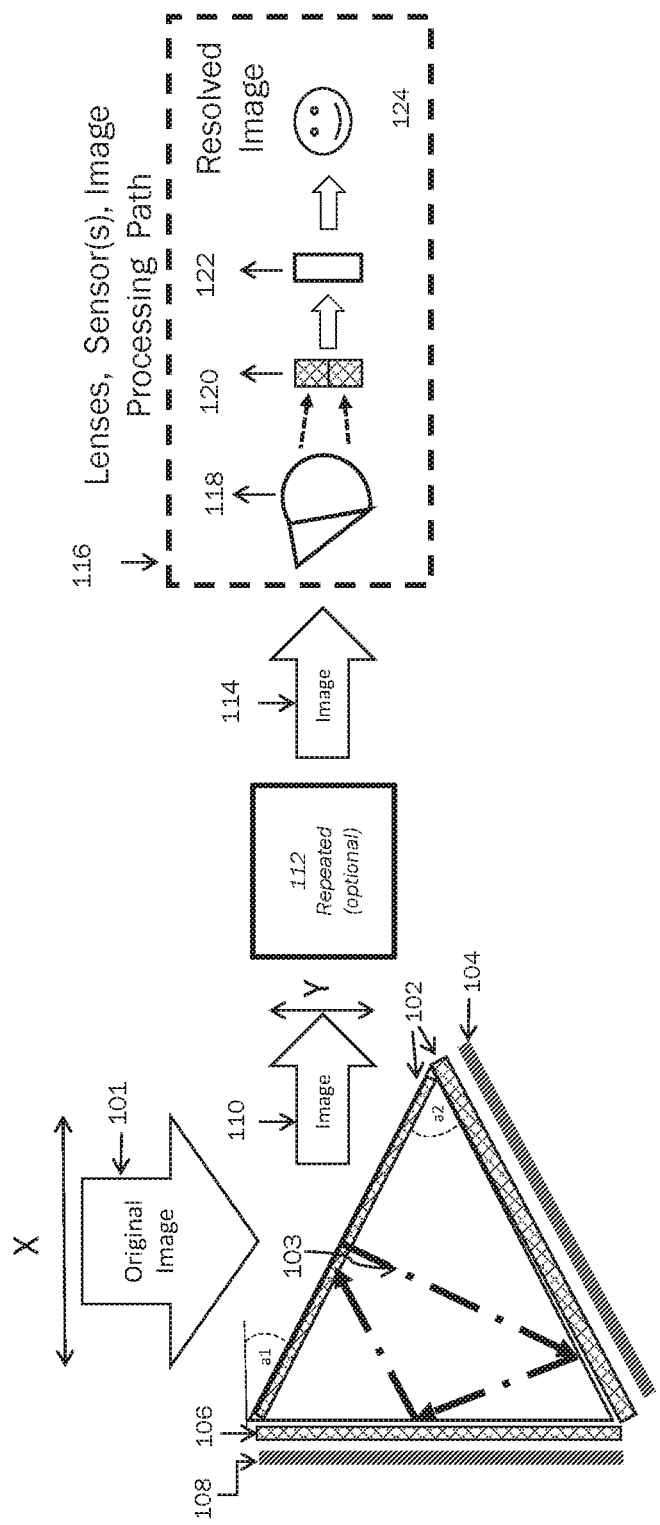
FIG. 1 shows an exemplary configuration of a half-diamond lens system, according to some embodiments of the disclosed invention.

FIG. 1 shows an exemplary configuration of a half-diamond lens system, according to some embodiments of the disclosed invention. As shown, near collimated light from an image 101 with a width of X enters a first surface of a half-diamond lens 103 and exits from the same first surface with an output (compressed or expanded) image 110 having a width Y. The ratio of X over Y defines the concentration factor in one plane. The half-diamond lens 103 includes optional apparatus 102 for processing the image of the object to reduce chromatic aberrations, such as a chromatic control structures, for example, a wedge, coating, a prism and/or diffraction gratings, and a reflecting surface 104, for example, a mirror, on a second surface.

The optional chromatic control structure 102 controls the (color) dispersion of the light due to dispersive characteristics of the half-diamond lens 103. For example, a wedge, a prism, a grin, or diffraction gratings causes the different spectrum colors refracted at different angle/wavelength to converge back to the original (white) light. Although, the surface of the chromatic control structure 102 of the half-diamond lens system is shown as a flat surface in FIG. 1, this surface of the chromatic control structure 102 does not need to be flat, and would not be flat for a case of a prism. Moreover, the orientation and angle of the prism in structure 102 would depend upon the dispersion characteristics of both the half-diamond lens 103 and the structure 102.

Reflecting surfaces, such as mirrored surface(s) can be added to the device using known techniques such as bonding or applying optical coatings. Although the chromatic control structure 102 is shown at the bottom and top of lens 103, in some embodiments, the structure may be incorporated within lens 103. For example 103 may contain a dichroic mirror to reflect light of specified wavelengths (such as blue), or 103 may be made of a gradient index material that provides chromatic control.

The half-diamond lens 103 may also optionally include another optional chromatic control structure 106, and a reflecting surface 108 on a third surface. The chromatic control structures 102 and 106 may be the same or different with respect to their material, structure and/or thickness, depending of the applications. Similarly, the reflecting surfaces 104 and 108 may be the same or different from each other.

After light from image 101 enters the first surface of the half-diamond lens 103, its color spectrum is optionally corrected by the optional chromatic control structures 102 and then reflected from the reflecting surface 104 placed on the second surface of the half-diamond lens 103. The internally reflected light is then optionally corrected again by the optional chromatic control structure 106 and then reflected from the reflecting surface 108 placed on the third surface of the half-diamond lens. This reflected light then exits from the first surface, that is, the same surface that it entered the lens. The first surface of the half-diamond lens may also include an optional chromatic control structure (not shown) to correct the chromatic dispersion of the light exiting the lens.

An anamorphic prism for correcting an anisotropy of a radiation angle of a beam is described in U.S. Pat. No. 4,750,819, the entire content of which is hereby expressly incorporated by reference. The anamorphic prism is formed as an achromatic structure using a first prism and a second prism. The refractive indexes and refractive index changes as a result of a wavelength fluctuation of the first and second prisms and an incident angle of the beam to the first prism can satisfy a predetermined relationship, where the beam can emerge from the second prism at an exit angle of 0 degrees, which corrects the anisotropy of the angle of the beam.

In some embodiments, both chromatic control structures 102 and 106 may be used. Structure 102 is specific to one image, whereas in a full diamond design, structure 106 is shared by both the left and right side of the prism, as described below.

As depicted, angle a1 is formed between the first surface of the diamond shape lens and the plane perpendicular to the direction of the light (beam) from the image, and the internal angle a2 is formed between the first surface and the second surface of the lens. Varying angles a1 and/or a2 will vary the size Y of the compressed or expanded image 110, and will also vary the exit beam angle. The size Y of compressed or expanded image 110 varies with the EM wavelength, angle a1 and a2, the type of the reflective material 104 and 108, and the type and geometry of achromatic structures 102, 104, and 106. Angles a1 and/or a2 values can be varied for specific applications, such as the degree of the compression needed, and desired exit beam angle. In many typical applications, angles a1 is between 25 and 35 degrees and a2 is between 40 to 50 degrees.

Optionally, the compressed or expanded image 110 can be further compressed and/or or expanded multiple times in the same planes or in different planes (to achieve a different aspect ratio) by one or more lens system 112, for example, another half-diamond lens. The compressed or expanded image 110 or 114 is then directed to an optional image processing path 116, including a focusing lens 118 to focus the compressed image onto light sensor(s) 120 (for example, CCD or CMOS sensor(s)). In some embodiments, the focusing lens 118 focuses the compressed or expanded image 110 or 114 onto an eyepiece for viewing by a human. An image processor 122 (implemented in software, hardware and/or firmware) corrects for any aberrations resulting from the lens system by using one or more image processing techniques. An example of correcting chromatic aberrations in hardware would be the use of one or more optical wedges and/or diffraction gratings, filters, or grin lenses, before the light sensor 120, that together have an achromatic effect for imaging. The refractive properties of the material of the diamond shape lens can be changed to assist in controlling chromatic dispersion for imaging applications as well. For example, the refractive index of the wedge can be dynamically changed by applying voltage or current to the lens comprised of certain material that refract the light differently under electric power.

If the chromatic correction is performed by an optical device (hardware), the correction is done before the image is received by the sensor(s) 120. However, if the chromatic correction is performed by software (executed on a processor), the corrections are performed after the image is received by the image sensor, that is, at the output of the sensor(s). In some embodiments, the color is corrected by software that adjusts pixel locations appropriately for each color (e.g. warping). A sensor with more colors can provide more precise color correction. In some embodiments, the Point Spread Functions to deconvolute the image can vary for each color and location on the image. In some embodiments, color correction is performed both in hardware and in software By concentrating light this way, the focusing lens system 118 can be much smaller. For example, the size of the focusing lens system is reduced approximately by the compression factor. Although in this example, the lens is a focal lens and requires another lens to focus the light into an image, in some embodiments, this could be used for beam shaping, or concentrating light for solar or sensing applications.

Figure 2:
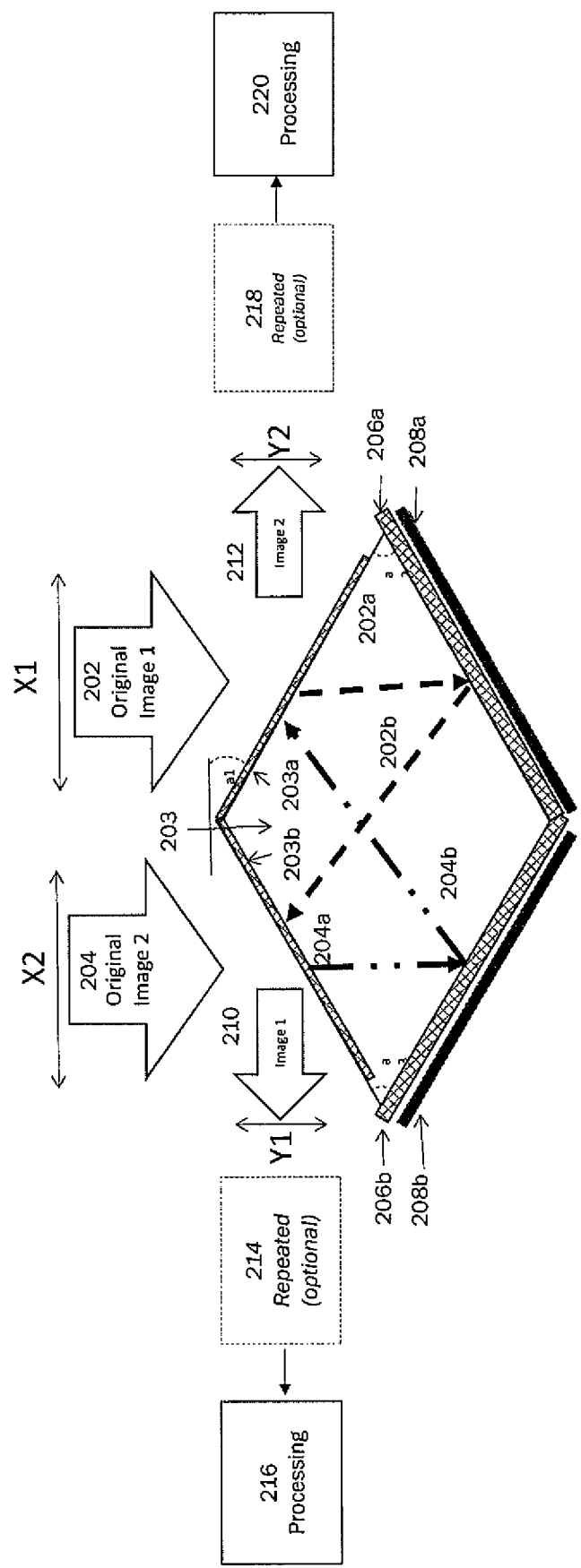
FIG. 2 illustrates an exemplary full-diamond lens system, according to some embodiments of the disclosed invention.

FIG. 2 illustrates a full-diamond lens system, according to some embodiments of the disclosed invention. As shown, in these embodiments, two half-diamond lenses are put together to form a full diamond shape lens 203. This full diamond shape lens 203 is capable of receiving and/or reflecting two images simultaneously. A light from a first image 202 with a width of X1 enters the lens at a first side (beam 202a), optionally processed for chromatic corrections by a chromatic control structures 203a and/or 206a, and is reflected from a reflecting surface 208a (beam 202b) at a second side and exits the lens at a fourth side to form a compressed or expanded first image 210 with a width Y1. Similar to the lens system of FIG. 1, the compressed or expanded first image 210 may optionally enter another lens system 214 (half-diamond or full diamond shape) to be further compressed in the same plane or a different plane. The compressed image may then be captured, processed, and combined with the compressed or expanded second image 212 in block 216.

Likewise, a light from a second image 204 with a width of X2 enters the lens at the fourth side (204a), optionally processed for chromatic corrections by a chromatic control structures 203b and/or 206b and is reflected from a reflecting surface 208b at a third side and exits the lens at the first side to form a compressed or expanded second image 212 with a width Y2. The compressed or expanded second image 212 may optionally enter another lens system 218 (half-diamond, full diamond shape, or conventional curved lens system) to be further compressed and/or expanded in the same plane or a different plane. The compressed or expanded second image 212 may then be captured, processed, and combined with the compressed or expanded first image 210 in block 220. For instance, in the case of an expanded light (e.g. microscope, projection or illumination), the light path is typically in the opposite direction, instead of being in the direction shown with different angles.

The two images can be combined together in a variety of ways. For example, the two images could be from different fields of view and stitched together, using known techniques in image processing. Alternatively, the two images could be of a similar or same field of view at different wavelengths to create images over a wide spectrum. Also, the two images could be used to create a stereographic view of a distant object. The images could be directed to different sensors or different eyes, for example in a binocular. Moreover, the one image could have a large field of view, and the second image could have a narrow field of view with a different resolution, or wavelength spectrum, for example combining a spotting scope and a rifle scope into one lens system. Telescopic sights are used with all types of systems that require accurate aiming but are most commonly found on firearms, particularly rifles. Some rifle scopes have integrated range finder or spotting scope, which can utilize the full-diamond lens system of the disclosed invention to accommodate an image with a large field of view and a second image with a narrow field of view with a different resolution, or wavelength spectrum.

In some embodiments multiple diamond shape lenses can be used in a single optical system to further reduce the size. In some embodiments the diamond shape lens can be used in combination with a reflective wedge described in U.S. patent application Ser. No. 15/222,058.

Although two symmetrical half-diamond lenses are shown to form the full diamond lens 202, the half-diamond lenses do not have to be symmetrical. For example, angles a2 and a3 do not have to be the same. For example, the angles a2 and a3 may be different to accomodate different size of the fields of view, different directions of the field of view, different wavelength spectrums, different apertures, different compression factors, different light directions, different aberration corrections, and/or different weight characteristics. Similarly angle a1 could be different for image 1 and image 2.

The two apertures of the half-diamond lenses can have different fields of view, or have the same field of view. By having two different fields of view, the total field of view can be expanded. If the apertures have the same field of view, each aperture can be used for different purposes. For example each sub aperture can be optimized for imaging in a different range of wavelengths. As another example, one may process a visible light, while the other may process infrared (IR) light, or one may process an optical light, while the other may process an electromagnetic (EM) beam. In some embodiments, the first image and the second image may be images of the same object, for example a person, tree or building, each entering the lens system at a different angle. This way the compressed first and second images may easily be combined to form a three-dimensional (3D) image of the object. Moreover, each aperture can be designed for illuminating a target object, and the other aperture can be designed for imaging or accepting an image of an object. Using illumination together with imaging can be useful for multiple applications, including microscopes to illuminate small targets, and also for sensing and detecting distant objects. For example combining a LIDAR with color images.

The chromatic control structures 203a, 203b, 206a and 206b may be the same or different structures. For example, chromatic control structures 203a and 206a can be used to correct the X1 image and chromatic control structures 203b and 206b can be used to correct the X2 image, if for example the two images are from different wavelengths. For instance, if one image is Infrared, red and green, and the other image is blue and ultraviolet, then the two chromatic control structures 206a and 206b are different between the X1 and X2 images. This makes it possible for both images to be near achromatic, and makes it possible to provide a very large wavelength range and still be near diffraction limited.

In some embodiments, the half-diamond lens system and/or the full-diamond lens system may include a moving reflective surface (instead of one of the fixed reflective surfaces), such as one or more moving mirrors, as described in the U.S. patent application Ser. No. 15/222,058. This way, the image of an object is reflected from multiple surfaces of the diamond-shaped lens, processed and compressed to form a compressed image of the same object. In these lens systems with moving reflective surface, the quality of the image is increased by reducing the field of view, and stitching many images together. This technique can improve final image resolution. Moving the mirror changes the view of what objects appear in the image. In these embodiments, the mirror is moved in a way that it can captures a series of images, each with a narrow field of view. The lens system then uses known image processing techniques to combine or stich the captured images together into one composite image with a large field of view. For example, known image stitching methods may be used to register, calibrate and blend the images to produce the final image.

Figure 5:
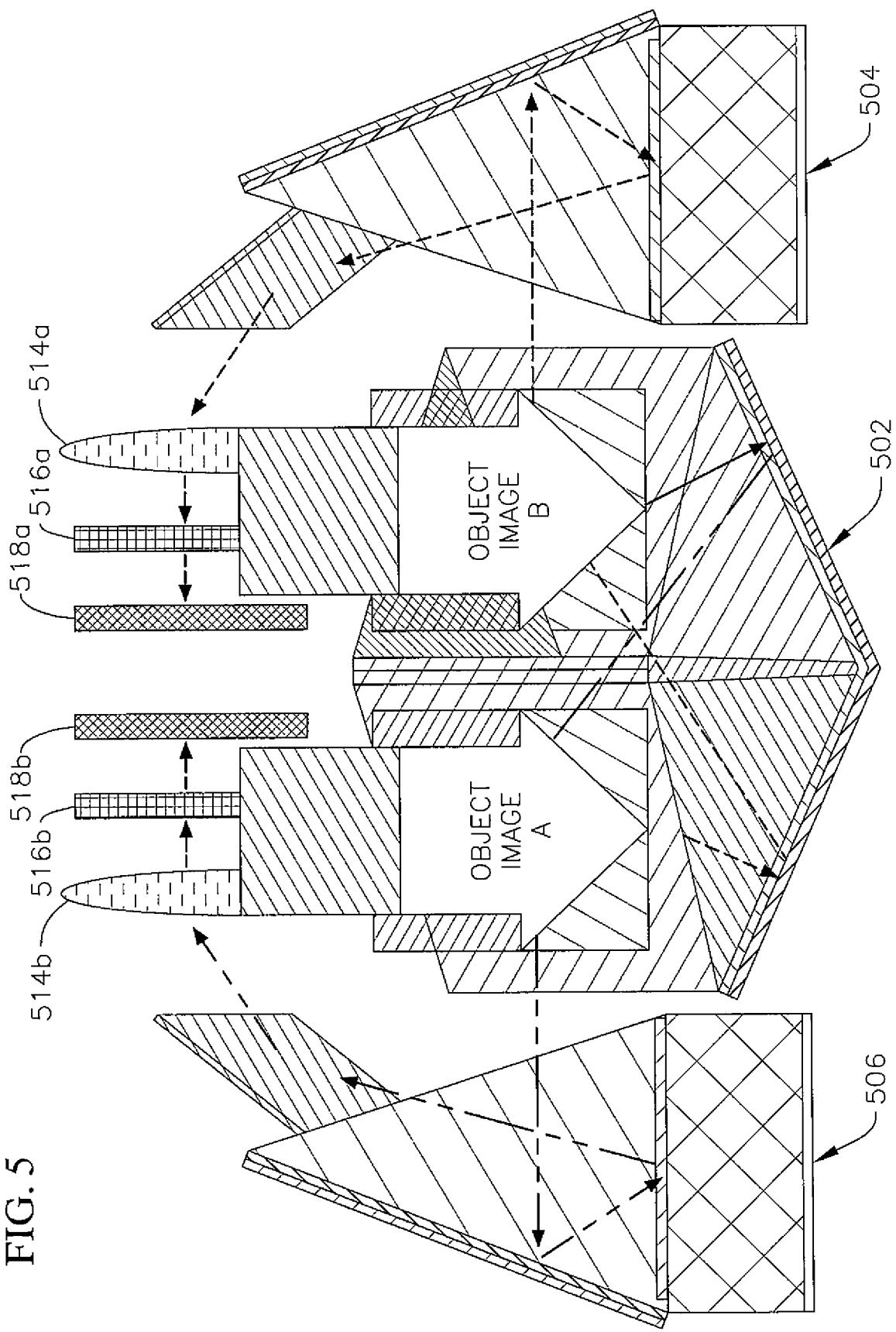
FIG. 5 illustrates an exemplary full-diamond lens system and two half-diamond lens system combined, according to some embodiments of the disclosed invention.

Because the imaging system has a relatively large aperture size with lots of light, images can be captured very quickly. Another reason to move the mirror is to adjust the field of view, or change the compression of one single image, for example, for digital or optical zooming applications. There are several different techniques to move the reflecting surface(s). Although mirror 404 is shown as rotating, in some embodiments, it is possible to tilt the reflective surface (e.g., a mirror) about a fulcrum, or rotate about the edge as shown in FIG. 5. In some embodiments, the mirror can be an array of micromirrors. The moving reflective surface(s) of the flat lens system may be combined with the dynamic changing of the refractive index of the refractive wedge-shaped material (as described above) to further enhance the lens system.

Figure 3:
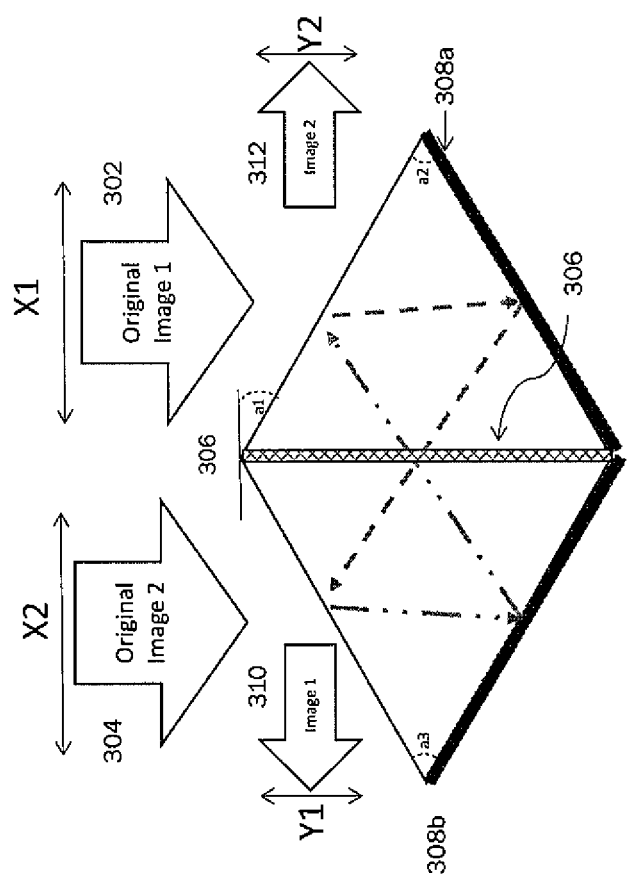
FIG. 3 depicts an exemplary full-diamond lens system with a shared chromatic correction structure, according to some embodiments of the disclosed invention.

FIG. 3 depicts an exemplary full-diamond lens system with a shared chromatic correction structure, according to some embodiments of the disclosed invention. In these embodiments, multiple chromatic structures can also be used. This configuration is similar to the configuration of FIG. 2, except that a chromatic correction structure 306, for example, a chromatic lens, prism or wedge, is placed between the two half-diamond shape lenses forming the full-diamond lens and thus is shared by the beam paths of both images. In these embodiments, the light from a first image 302 with a width of X1 enters the lens at a first side and is reflected from a reflecting surface 308a at a second side. The reflected light is then chromatically processed/corrected by a chromatic correction structure 306 that is formed between the two half-diamond shape lens and exits the lens system at a fourth side to form a compressed or expanded first image 310 with a width Y1.

Similarly, a second image 304 with a width of X2 enters the lens at the fourth side and is reflected from a reflecting surface 308b at a third side. This reflected light is then also chromatically processed/corrected by the same chromatic correction structure 306 and exits the lens at the first side to form a compressed or expanded second image 312 with a width Y2. This way, only one chromatic correction structure 306 is used for both images, which reduces the size and complexity of the lens system. As explained above, with respect to FIGS. 1 and 2, the compressed or expanded images may optionally enter another lens system for further compression in the same plane or a different plane. The compressed or expanded images may then be captured, processed, and combined together, as described above.

As explained above, in some embodiments, other chromatic control surfaces may be positioned on the first surface of the lens system. This way, another degree of freedom in designing color control is provided.

Figure 4:
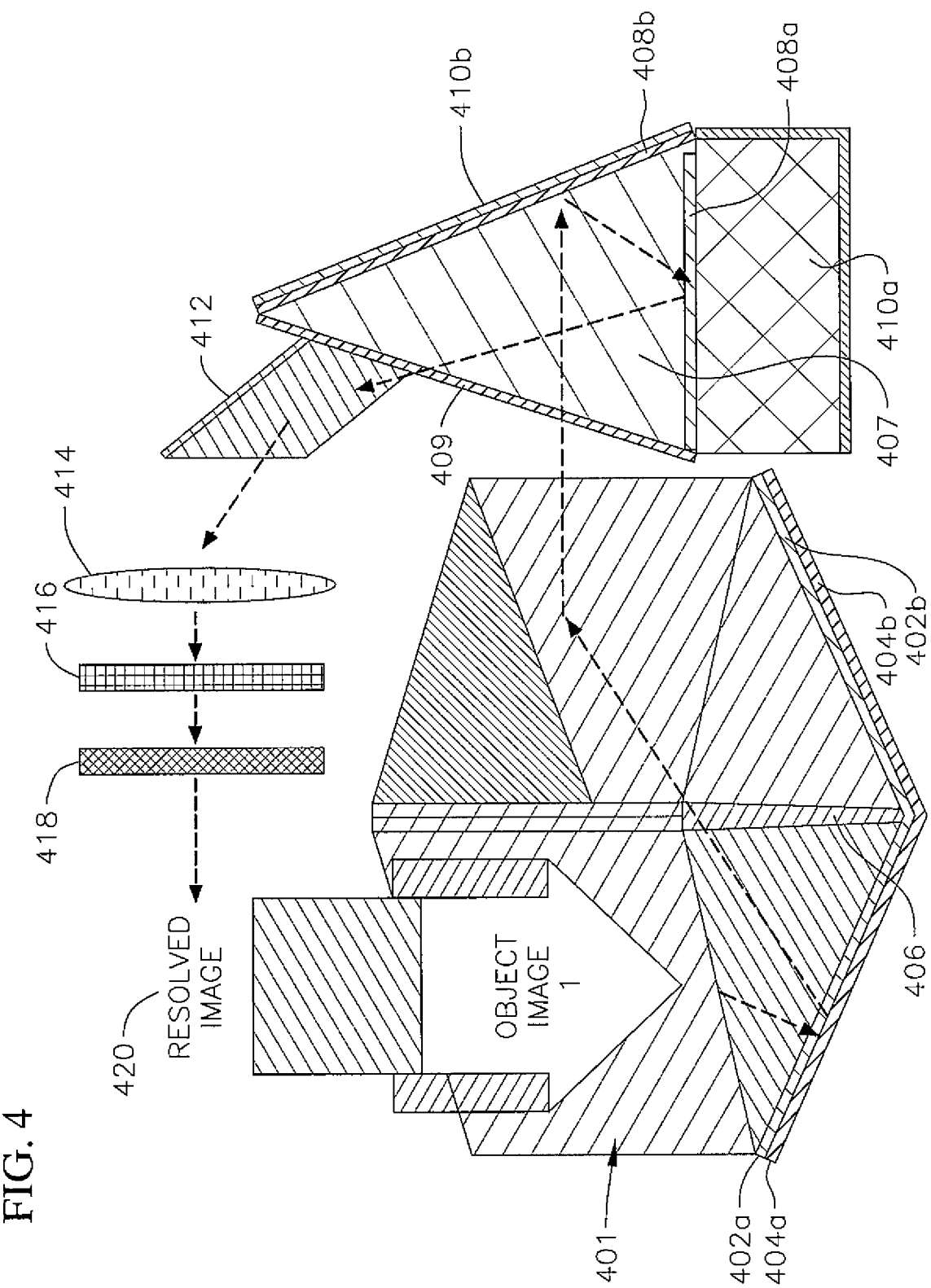
FIG. 4 illustrates an exemplary full-diamond lens system and a half-diamond lens system combined, according to some embodiments of the disclosed invention.

FIG. 4 illustrates an exemplary full-diamond lens system and a half-diamond lens system combined, according to some embodiments of the disclosed invention. As shown, an image of an object enters a full-diamond lens 401, optionally chromatically corrected by a chromatic correction structure 402a and reflected from a reflecting surface 404a (e.g., a mirror). The image is then optionally chromatically corrected again by a chromatic correction structure 406, before it is refracted and exits the full-diamond lens 401 b. It is noted that one or more of the chromatic correction structures 402a and 402b are optional. Moreover, each of the chromatic correction structures 402a and 402b may be the same or different structures/surfaces, for example, a coating or grating on the surfaces of the full-diamond lens 401.

The image exiting the full-diamond lens 401 then enters a half-diamond lens 407 to be further processed, in the same plane or different plane. The image is then optionally chromatically corrected by chromatic correction structure 408b and reflected from a reflecting surface 410b (e.g., a mirror). The image is then chromatically corrected again by a second chromatic correction structure 408a and reflected from a reflecting surface 410a, before it is refracted and exits the half-diamond lens 407. The exiting image may optionally be chromatically corrected again by a third chromatic correction structure 409. Each of the chromatic correction structures 408a, 408b and 409 may be the same or different structures/surfaces, for example, a coating or grating on the surfaces of the half-diamond lens 407. Furthermore, the full-diamond lens 401 and/or the half-diamond lens 407 may include additional chromatic correction structures, for example, on the surface which the image enters into the lens and/or the surface from which the image exits the lens.

The exiting image is then directed to a conventional lens system through one or more optional fold mirrors 412. The image is then directed to an optional focusing lens 414 to focus the compressed image onto light sensor(s) 416 (for example, CCD or CMOS sensor(s)). In some embodiments, the focusing lenses 414 focuses the processed (e.g., compressed) image onto an eyepiece for viewing by a human. An image processor 418 (implemented in software, hardware and/or firmware) corrects for any aberrations resulting from the lens system by using one or more image processing techniques.

Although in the example of FIG. 4, only one object image is shown, there can be two object images both entering or one entering and the other one illuminating the full-diamond lens 401, similar to the lens system shown in FIG. 2 or 3. Moreover, although a single half-diamond lens 407 is shown, there may be another half-diamond lens for further processing of a second image in the lens system of FIG. 4, similar to that shown in FIG. 5. Also, one or more of the half-diamond lenses may be replaced by a full-diamond lens 407

FIG. 5 illustrates an exemplary full-diamond lens system and two half-diamond lens system combined, according to some embodiments of the disclosed invention. A first object image A enters a full-diamond lens 502 then enters a half-diamond lens 504 to be further processed, in the same plane or different plane. Similarly, a second object image B enters the full-diamond lens 502 then enters a half-diamond lens 506 to be further processed, in the same plane or different plane. Each of the processed images is then directed to an optional focusing lens 514a and 514b to focus the compressed image onto respective light sensor(s) 516a and 516b. Each image processor 518a and 518b (implemented in software, hardware and/or firmware) corrects for any aberrations resulting from the respective lens system by using one or more image processing techniques.

In some embodiments, the first image A and the second image B may be images of the same object, each entering the lens system at a different angle. This way the compressed first and second images may easily be combined to form a 3D image of the object. Moreover, each surface/aperture can be designed for illuminating a target object, and the other aperture can be designed for imaging or accepting an image of an object. As one skilled in the art would recognize, the illumination can occur independently and/or simultaneously on each side.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as defined by the appended claims and drawings.

The invention claimed is:

1. A diamond-shaped lens system comprising:
a first half diamond-shaped lens comprising of refractive material and having a first surface, a second surface and a third surface, wherein the first surface refracts incident light beams from a first object having a width of X1, from the first surface towards the second surface;
a second half diamond-shaped lens positioned next to the first half diamond-shaped lens and comprising of refractive material and having a first surface, a second surface and a third surface for refracting incident light beams from a second object having a width of X2, from the first surface towards the second surface, wherein
the third surface of the first half diamond-shaped lens is positioned next to the third surface of the second half diamond-shaped lens to form a full diamond-shaped lens, the full diamond-shaped lens having a first surface the same as the first surface of the first half diamond-shaped lens, a second surface the same as the second surface of the first half diamond-shaped lens, a third surface the same as the second surface of the second half diamond-shaped lens, and a fourth surface the same as the first surface of the second half diamond-shaped lens;
a first reflective material positioned at the second surface of the full diamond-shaped lens for reflecting refracted light beams from the first surface of the full diamond-shaped lens at an angle toward the fourth surface of the full diamond-shaped lens to exit the fourth surface to form a first image of the first object with a width Y1;
a second reflective material positioned at the third surface of the full diamond-shaped lens for reflecting light beams reflected from the fourth surface of the full diamond-shaped lens toward the first surface of the full diamond-shaped lens to exit the first surface to form a second image of the second object with a width Y2; and
a chromatic control structure for correcting chromatic dispersions of the first and second image.

2. The diamond-shaped lens system of claim 1, wherein the chromatic control structure is positioned on one or more of the second surface and the third surface of the full diamond-shaped lens.

3. The diamond-shaped lens system of claim 1, wherein the chromatic control structure is positioned between the third surface of the first half diamond-shaped lens and the third surface of the second half diamond-shaped lens to form a shared chromatic control structure shared by the first and second half diamond-shaped lenses.

4. The diamond-shaped lens system of claim 1, wherein the chromatic control structure comprises of one or more of a wedge, a prism, a grin lens, or diffraction gratings.

5. The diamond-shaped lens system of claim 1, further comprising an image processor for combining the first image with the second image to form a combined image.

6. The diamond-shaped lens system of claim 5, wherein the combined image comprises of one or more of a stitched image of the first and second images, and a three dimensional image of the first or second object.

7. The diamond-shaped lens system of claim 5, wherein the first object is a light source and first half diamond-shaped lens is used to illuminate the second object.

8. The diamond-shaped lens system of claim 5, wherein the combined image is a three-dimensional image.

9. A rifle scope comprising the diamond-shaped lens system of claim 1.

10. The diamond-shaped lens system of claim 1, further comprising a half diamond-shaped lens positioned next to the second half diamond-shaped lens and comprising of refractive material and having a first surface, a second surface and a third surface.

11. A telescope comprising the diamond-shaped lens system of claim 1.

12. A microscope comprising the diamond-shaped lens system of claim 1.

13. A binocular comprising the diamond-shaped lens system of claim 1.

14. A telecentric lens system comprising the diamond-shaped lens system of claim 1.

* * * * *